United States Patent [19]
Shirochi et al.

[11] Patent Number: 5,243,411
[45] Date of Patent: Sep. 7, 1993

[54] ANTI-PIRACY VIDEO TAPE SYSTEM HAS ANTI-PIRACY COMPONENTS ADDED TO THE LUMINANCE SIGNAL AND THE COLOR DIFFERENCE SIGNALS

[75] Inventors: Yoshiki Shirochi, Chiba; Toshihiko Numakura; Isao Saito, both of Kanagawa, all of Japan

[73] Assignee: Sony Corporation, Tokyo, Japan

[21] Appl. No.: 892,039

[22] Filed: Jun. 2, 1992

[30] Foreign Application Priority Data
Jun. 14, 1991 [JP] Japan .................... 3-169356

[51] Int. Cl.$^5$ ............... H04N 11/06; H04N 7/08
[52] U.S. Cl. ................... 358/12; 358/142; 360/60; 380/5
[58] Field of Search ........... 358/142, 146, 21 R, 358/310, 12, 335; 360/60, 27; 380/5

[56] References Cited

U.S. PATENT DOCUMENTS

| | | | |
|---|---|---|---|
| 4,528,588 | 7/1985 | Löfberg | 380/5 X |
| 4,663,674 | 5/1987 | Osawa | 360/60 X |
| 4,972,471 | 11/1990 | Gross et al. | 380/5 X |
| 5,134,496 | 7/1992 | Schwab et al. | 358/335 |

FOREIGN PATENT DOCUMENTS

| | | | |
|---|---|---|---|
| 2,567,753 | 8/1987 | E.P.O. | 7/08 |
| 3,606,615 | 9/1989 | E.P.O. | 20/00 |

*Primary Examiner*—James J. Groody
*Assistant Examiner*—Safet Metjahic
*Attorney, Agent, or Firm*—Lewis H. Eslinger; Jay H. Maioli

[57] ABSTRACT

An anti-piracy signal generating circuit for generating anti-piracy signal components on a video signal reproduced by a first video unit, the signal components being interleaved to a frequency $f_H$ in the band of the video signal in accordance with the video signal components and a signal superimposing circuit for superimposing the anti-piracy signal components intermittently on the luminance signal, first color difference signal, and second color difference signal.

6 Claims, 7 Drawing Sheets

ANTI-PIRACY VIDEO TAPE SYSTEM HAS ANTI-PIRACY COMPONENTS ADDED TO THE LUMINANCE SIGNAL AND THE COLOR DIFFERENCE SIGNALS

BACKGROUND OF THE INVENTION

1. Field of the Invention

The present invention relates to a video signal processing apparatus and, more particularly, relates to a video signal processing apparatus for superimposing an anti-piracy signal (pilot signal) on a video signal, thereby preventing a video signal from being illegally dubbed, and a video signal processing apparatus for detecting an anti-piracy signal superimposed on a reproduced video signal, thereby prohibiting a video signal from being recorded.

2. Description of the Prior Art

To prohibit a video signal from being illegally dubbed, in a home-use VTR or the like, it is proposed that an anti-piracy signal (pilot signal) for prohibiting the video signal from being recorded is interposed to a synchronous signal portion.

However, in the above mentioned technique for interposing the anti-piracy signal to the synchronous signal portion, if the synchronous signal is replaced, the anti-piracy signal is also readily removed.

As another example of techniques for preventing a video signal from being illegally dubbed, a technique for superimposing on the video signal the anti-piracy signal at a high frequency out of the video signal band has been proposed. In this technique, since the anti-piracy signal is present out of the frequency band of the video signal, an image reproduced by a monitor unit is not disadvantageously deteriorated. However, in this technique, by a low pass filter in a simple circuit construction, the anti-piracy signal is readily removed. Thus, this technique does not satisfactorily prevent the video signal from being illegally dubbed.

Although other examples of techniques for preventing the video signal from being illegally dubbed have been known, an effective technique for preventing the video signal from being illegally dubbed without deterioration of the reproduced image has not been yet accomplished.

OBJECTS AND SUMMARY OF THE INVENTION

Therefore, an object of the present invention is to solve the above mentioned problems and to provide a video signal processing apparatus for providing a high quality of the reproduced video signal and for superimposing on a video signal an anti-piracy signal which is not easily removed.

Another object of the present invention is to provide a video signal processing apparatus for detecting the anti-piracy signal from a reproduced video signal superimposed thereon and for preventing (prohibiting) the video signal from being recorded.

According to an aspect of the invention, there is provided a video signal processing apparatus, comprising a circuit for generating an anti-piracy signal having a predetermined frequency which is interleaved to a horizontal scanning frequency in a frequency band of a video signal and having an amplitude in a predetermined range according to a component of the video signal, and a circuit for superimposing the anti-piracy signal on a part of the video signal at an intermittent timing. This video signal processing apparatus is disposed in a reproducing system of a VTR unit or the like.

The anti-piracy signal generating circuit of the video signal processing apparatus in accordance with the present invention generates an anti-piracy signal having a frequency in the frequency band of a video signal and being interleaved to a horizontal scanning frequency. This anti-piracy signal does not substantially affect the reproduced video signal. In addition, the amplitude of the anti-piracy signal is determined in accordance with a component of a video signal so that the deterioration of the reproduced image on a monitor unit is minimized and the amplitude of the anti-piracy signal becomes larger. The anti-piracy signal superimposing circuit superimposes the anti-piracy signal on the video signal intermittently, for example, at intervals of several fields.

Thus, even if the anti-piracy signal having the above mentioned frequency and amplitude is superimposed on the video signal, the image reproduced on the monitor unit is not substantially deteriorated. In particular, when the anti-piracy signal is intermittently superimposed, the amplitude thereof can be increased.

The above, and other, objects, features and advantages of the present invention will become readily apparent from the following detailed description thereof, which is to be read in connection with the accompanying drawings.

DETAILED DESCRIPTION OF THE PREFERRED EMBODIMENTS

Figure 1:
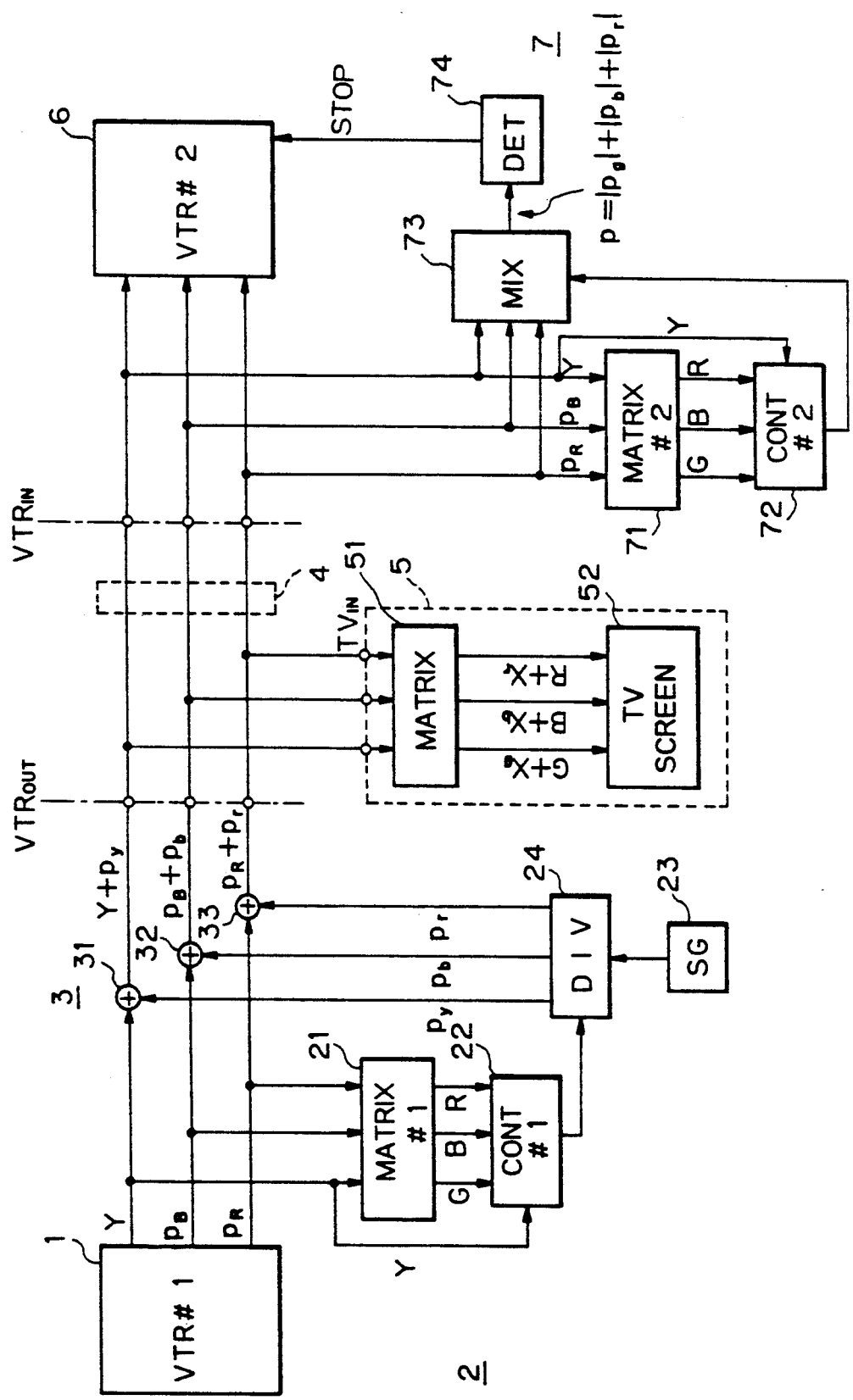
FIG. 1 is a block diagram showing a construction of a first embodiment of a video signal processing apparatus in accordance with the present invention.

FIG. 1 is a block diagram showing a construction of a first embodiment of a video signal processing apparatus in accordance with the present invention. In this figure, a reproduced video signal sent from a first video unit 1 is displayed by a monitor unit 5 and recorded by a second video unit 6.

The first video unit 1 reproduces a video signal which consists of a luminance signal Y, a first color difference signal $P_B$, and a second color difference signal $P_R$. To prohibit the second video unit 6 from recording this video signal, an anti-piracy signal generating circuit 2 generates an anti-piracy signal. A signal superimposing circuit 3 superimposes the anti-piracy signal on the reproduced video signal.

In the second video unit 6, an anti-piracy signal detecting circuit 7 detects the anti-piracy signal and outputs to the second video unit 6 a dubbing prohibition signal STOP which prohibits the second video unit 6 from recording the video signal superimposed with the anti-piracy signal. The anti-piracy signal has an amplitude which can be detected for prohibiting a dubbing operation and which does not substantially affect an image reproduced by the monitor unit 5. The amplitude of the anti-piracy signal is described later in more detail. Since the video signal processing apparatus in accordance with the present invention does not directly involve a sound signal, its description is omitted.

The anti-piracy signal generating circuit 2 comprises a matrix circuit 21, a controlling circuit 22, a signal generating circuit 23, and an anti-piracy signal distributing circuit 24. The matrix circuit 21 converts a video signal, which consists of the luminance signal Y, the first color difference signal $P_B$, and the second color difference signal $P_R$, into three primary colors G, B, and R by known matrix computations. The controlling circuit 22 analyzes the component ratio of G, B, and R being converted and calculates a ratio of anti-piracy signal components py, pb, and pr in accordance with G, B, and R computed by the matrix circuit 21. The anti-piracy signal distributing circuit 24 outputs the anti-piracy signal components py, pb, and pr in accordance with the anti-piracy signal distribution ratio elements computed by the controlling circuit 22 by using a frequency signal which is received from the signal generating circuit 23. The signal superimposing circuit 3 comprises signal adding circuits 31, 32, and 33. The signal adding circuit 31 superimposes the anti-piracy signal component py with the luminance signal Y. The signal adding circuit 32 superimposes the anti-piracy signal component pb with the first color difference signal $P_B$. The signal adding circuit 33 superimposes the anti-piracy signal component pre with the second color difference signal $P_R$.

Now, a generating method of the anti-piracy signal components py, pb, and pr by the anti-piracy signal generating circuit 2 is described in detail.

In accordance with G, B, and R converted by the matrix circuit 21, the controlling circuit 22 determines signal distribution ratio elements xg, xb, and xr of the anti-piracy signal components py, pb, and pr in accordance with the following formula. The anti-piracy distribution ratio elements xg, xb, and xr represent component ratios of the anti-piracy signal component py, pb, and pr which are unremarkable on a reproduced image on the monitor unit 5.

(a) A distribution ratio of which the anti-piracy signal is intensively interposed to only Y component is given by the formula (1).

$$\begin{vmatrix} xg = 1.0 \\ xb = 1.0 \\ xr = 1.0 \end{vmatrix} = \begin{vmatrix} 1.0 & -0.227 & -0.477 \\ 1.0 & 1.826 & 0.0 \\ 1.0 & 0.0 & 1.576 \end{vmatrix} * \begin{vmatrix} py = 1.0 \\ pb = 0.0 \\ pr = 0.0 \end{vmatrix} \quad (1)$$

When the relations of py=1, pb=1, and pr=1 as the anti-piracy signal components are satisfied, the anti-piracy signal distribution ratio elements computed by the controlling circuit 22 become xg=1.0, xb=1.0, and xr=1.0.

Numerals in the matrix of the right term are converting coefficients of the luminance signal Y, the first color difference signal $P_B$, and the second color difference signal $P_R$ against G, B, and R.

(b) Distribution ratio elements of an image whose G component is large or a monochrome image whose anti-piracy signal is unremarkable are given by the formula (2).

$$\begin{vmatrix} xg = 0.0 \\ xb = 1.826 \\ xr = 1.0 \end{vmatrix} = \begin{vmatrix} 1.0 & -0.227 & -0.477 \\ 1.0 & 1.826 & 0.0 \\ 1.0 & 0.0 & 1.576 \end{vmatrix} * \begin{vmatrix} py = 0.0 \\ pb = 1.0 \\ pr = -0.475 \end{vmatrix} \quad (2)$$

(c) Distribution ratio elements of an image whose R component is large and whose anti-piracy signal is unremarkable are given by the formula (3).

$$\begin{vmatrix} xg = -0.277 \\ xb = 1.826 \\ xr = 0.0 \end{vmatrix} = \begin{vmatrix} 1.0 & -0.227 & -0.477 \\ 1.0 & 1.826 & 0.0 \\ 1.0 & 0.0 & 1.576 \end{vmatrix} * \begin{vmatrix} py = 0.0 \\ pb = 1.0 \\ pr = 0.0 \end{vmatrix} \quad (3)$$

(d) Distribution ratio elements of an image whose B component is large and whose anti-piracy signal is unremarkable are given by the formula (4).

$$\begin{vmatrix} xg = -0.477 \\ xb = 0.0 \\ xr = 1.576 \end{vmatrix} = \begin{vmatrix} 1.0 & -0.227 & -0.477 \\ 1.0 & 1.826 & 0.0 \\ 1.0 & 0.0 & 1.576 \end{vmatrix} * \begin{vmatrix} py = 0.0 \\ pb = 0.0 \\ pr = 1.0 \end{vmatrix} \quad (4)$$

(e) Distribution ratio elements of an image whose G and R components are large and whose anti-piracy signal is unremarkable are given by the formula (5).

$$\begin{vmatrix} xg = 0.0 \\ xb = 2.0 \\ xr = 0.0 \end{vmatrix} = \begin{vmatrix} 1.0 & -0.227 & -0.477 \\ 1.0 & 1.826 & 0.0 \\ 1.0 & 0.0 & 1.576 \end{vmatrix} * \begin{vmatrix} py = 0.174 \\ pb = 1.0 \\ pr = -0.111 \end{vmatrix} \quad (5)$$

If one of the above mentioned conditions is not satisfied, the anti-piracy signal is not superimposed or another condition is selected. For example, the anti-piracy signal components of a monochrome image are represented with py=0, pb=1, and pr=-0.475. If the anti-piracy signal is superimposed directly to G, B, and R instead of the luminance signal Y, the first color difference signal $P_B$, and the second color difference signal $P_R$, the signal generating circuit 23 directly determines the above mentioned anti-piracy signal distribution ratio elements xg, xb, and xr without using the matrix circuit 21.

Now, a frequency characteristic and a superimposing timing of the above mentioned anti-piracy signal components py, pb, and pr are described.

Figure 2:
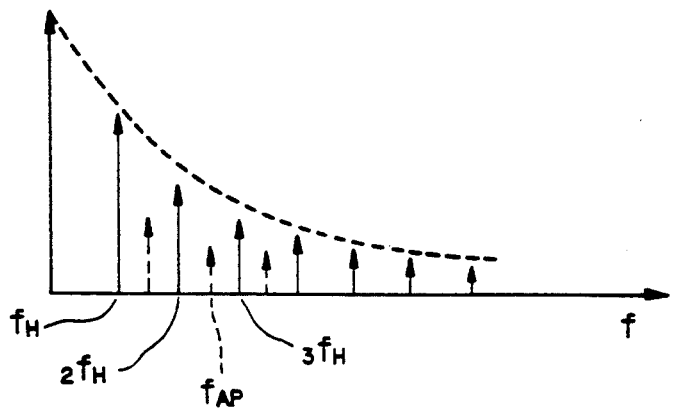
FIG. 2 is a chart showing a frequency characteristic of an anti-piracy signal generated by an anti-piracy signal generating circuit shown in FIG. 1.
Figure 3:
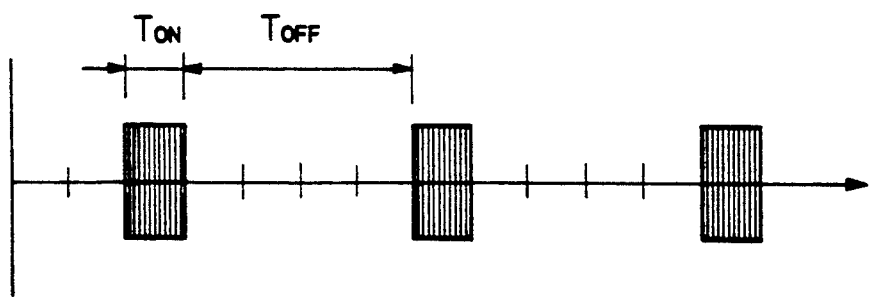
FIG. 3 is a timing chart showing the anti-piracy signal superimposed on a video signal generated by the anti-piracy signal generating circuit shown in FIG. 1.
Figure 4:
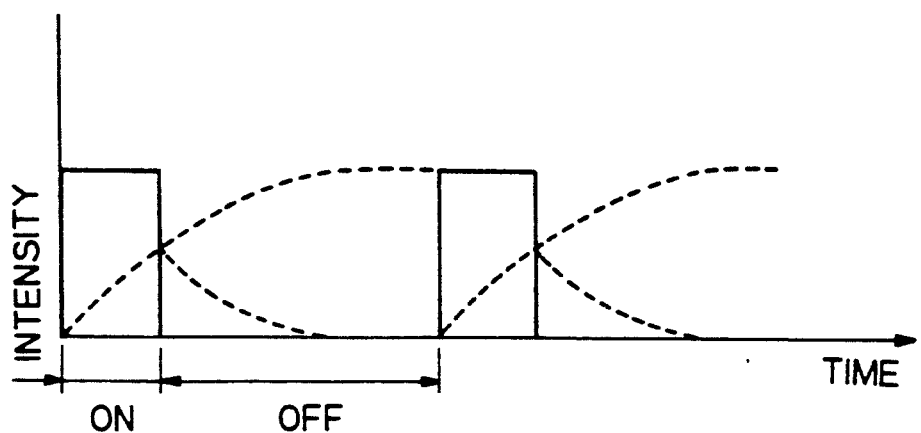
FIG. 4 is a detailed timing chart showing the anti-piracy signal shown in FIG. 3.
Figure 5:
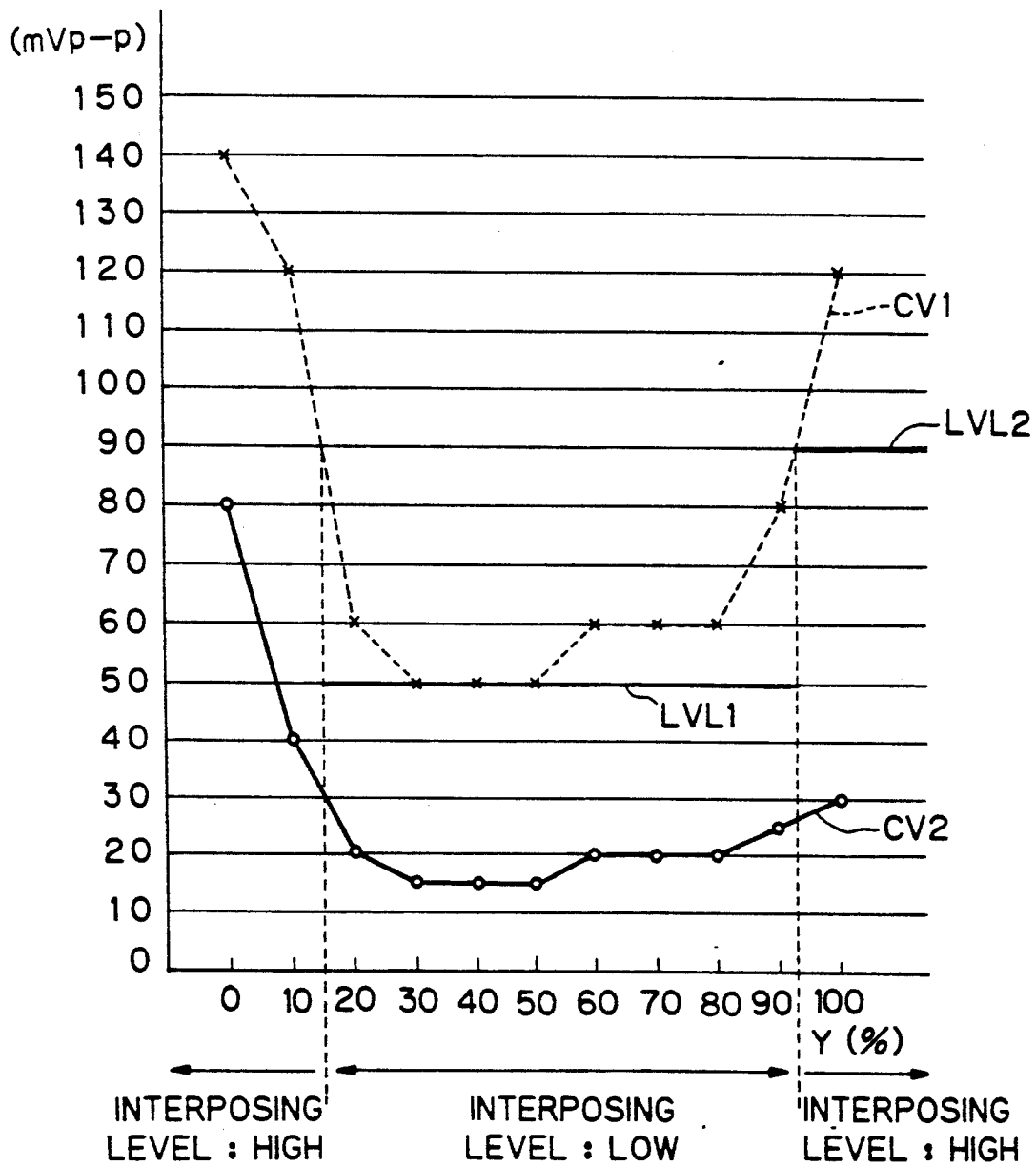
FIG. 5 is a chart showing an amplitude characteristic of the anti-piracy signal shown in FIG. 4.

FIG. 2 is a chart showing a frequency characteristic of the anti-piracy signal components py, pb, and pr generated by the anti-piracy signal distributing circuit 24 in accordance with a signal received from the signal generating circuit 23. FIG. 3 is a chart showing a superimposing timing of these components py, pb, and pr. FIG. 4 is an enlarged diagram of the anti-piracy signal of FIG. 3. FIG. 5 is a diagram showing an amplitude characteristic of the anti-piracy signal.

The signal generating circuit 23 which is provided with a PLL (phase locked loop) circuit generates a signal with a predetermined frequency which is accurately phase-locked in accordance with a horizontal synchronous signal detected by the first video unit 1.

The frequency of the signal generated by the signal generating circuit 23 is referred to as an anti-piracy frequency $f_{AP}$. This anti-piracy frequency $f_{AP}$ is interleaved to a horizontal scanning frequency $f_H$ which defines a horizontal synchronization in accordance with the formula (6) that follows.

$$f_{AP}=(N+\tfrac{1}{2})f_H \qquad (6)$$

where N is a frequency dividing ratio of a frequency dividing circuit (not shown in the figure) of the PLL circuit in the signal generating circuit 23. In the example shown in FIG. 2, the relation of N=2 is satisfied. However, the value of N can be freely set.

The anti-piracy signal having the anti-piracy frequency $f_{AP}$ is not superimposed every field, but at intervals of a plurality of fields. In the example shown in FIG. 3, the anti-piracy signal is superimposed on a reproduced video signal, which consists of the luminance signal Y, the first color difference signal $P_B$, and the second color difference signal $P_R$, at intervals of five fields.

In particular, the anti-piracy signal is superimposed in a video signal area. For example, with respect to the luminance signal Y, the anti-piracy signal component py is superimposed on a substantial luminance signal component in a horizontal blanking period following a tri-value synchronous signal. In other words, since the anti-piracy signal component py is not superimposed on the synchronous signal, out-of synchronization does not take place.

As shown in FIGS. 3 and 4, a pilot signal is superimposed on a video signal (a substantial signal component) during a time period $T_{ON}$ in which the eyes' integration effect of a person who monitors the monitor unit does not take place. The superimposing of the pilot signal is prohibited during a time period $T_{OFF}$ in which the eyes' integration effect is reset. In other words, by changing the duty cycle, the equivalent intensity to the person's eyes is lowered. If the ON time period (superimposing time) $T_{ON}$ is shortened, the effect of the pilot signal against a reproduced image on the monitor unit is reduced. In consideration of conditions such as a screen processing timing and signal synchronization, the time periods $T_{ON}$ and $T_{OFF}$ are set to one field and five fields, respectively.

A video signal on which the anti-piracy signal components py, pb, and pr are superimposed is inversely converted into the anti-piracy signal distribution ratio elements xg, xb, and xr which are superimposed on G, B, and R by the matrix circuit 51 and then reproduced on a TV screen 52. FIG. 5 shows an amplitude characteristic of the anti-piracy signal that a person sees on the TV screen 52.

In FIG. 5, a curve CV2 represents an upper limit of the amplitude of the anti-piracy signal which does not affect the luminance signal Y having an amplitude of 700 mV when a person observes on the TV screen 52 a reproduced image where the anti-piracy signal is superimposed on the reproduced luminance signal Y every field. A curve CV1 represents an upper limit of the amplitude which does not affect the luminance signal Y when a person observes on the TV screen 52 a reproduced image where the anti-piracy signal component py is superimposed on the luminance signal Y at intervals of M=30 fields.

The amplitude of the luminance signal Y remarkably affects a reproduced image. In addition, an amplitude of the anti-piracy signal which is continuously superimposed significantly differs from an amplitude of the anti-piracy signal which is intermittently superimposed at intervals of M fields. When the anti-piracy signal having a large amplitude is intermittently superimposed, the signal does not much affect a reproduced image on the TV screen 52.

When the anti-piracy signal has a large amplitude, the anti-piracy signal detecting circuit 7 can readily detect this signal, thereby making illegal dubbing difficult. In addition, when this anti-piracy signal is removed, the quality of the reproduced video signal is remarkably deteriorated. Thus, in the present invention, the anti-piracy signal having as large an amplitude as possible is intermittently superimposed to the video signal.

In this example, when the interposing level is low, the maximum amplitude of the anti-piracy signal which does not substantially affect a reproduced image on the TV screen 52 is the first level, LVL1, or below. Thus, in this embodiment, the amplitude of the anti-piracy signal superimposed on the luminance signal Y is in the range from around 50 mV. However, the range may deviate depending on M fields being selected.

Thus, even if the anti-piracy signal which is interleaved to the frequency $f_H$ and which has the above mentioned amplitude range is superimposed to a video signal, the reproduced image on the TV screen 52 is not substantially affected.

Figure 6:
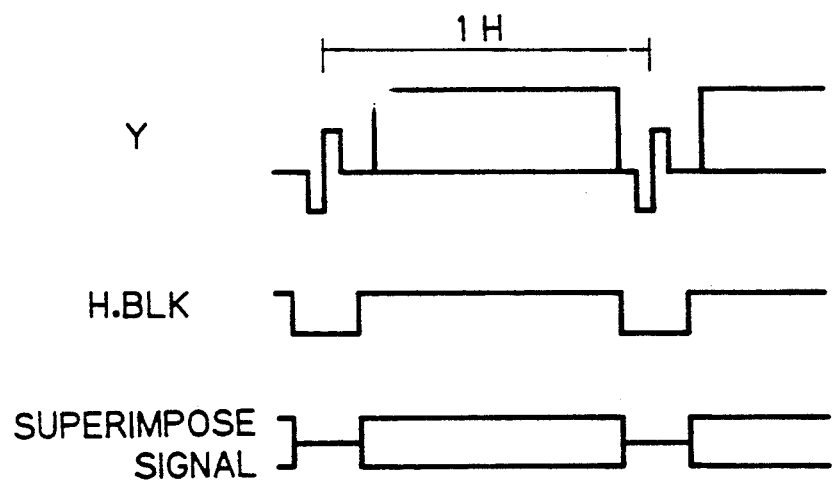
FIG. 6 is a timing chart showing a horizontal blanking period in which the anti-piracy signal is superimposed by the video signal processing apparatus shown in FIG. 1.
Figure 7:
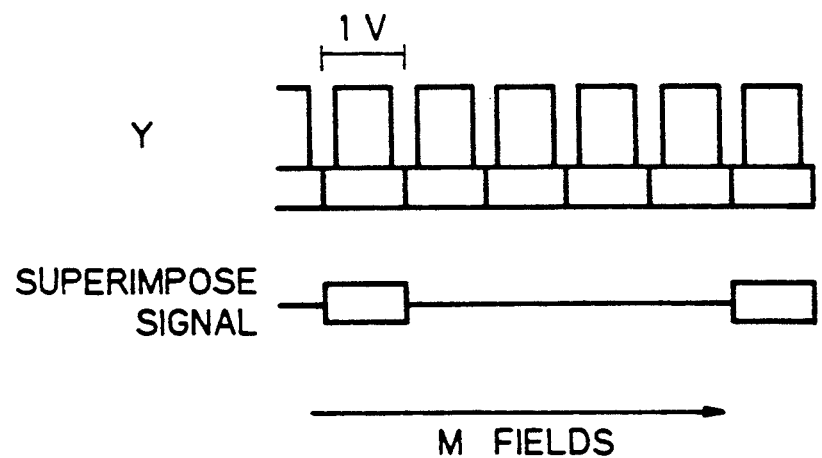
FIG. 7 is a timing chart showing fields at which the anti-piracy signal is superimposed by the video signal processing apparatus shown in FIG. 1.

The anti-piracy signal (superimposing signal) is superimposed on a video signal in a video area following a tri-value synchronous signal of the luminance signal Y as shown in FIG. 6. FIG. 7 shows signal waveforms representing that the anti-piracy signal is superimposed at intervals of M fields.

Now, an operation of prohibiting a signal to which the anti-piracy signal is superimposed from being illegally dubbed is described. The second video unit 6 shown in FIG. 1 has a circuit for recording a reproduced video signal on a video tape.

In addition, the anti-piracy signal detecting circuit 7 shown in FIG. 1 is provided with a matrix circuit 71, a controlling circuit 72, a signal compositing circuit 73, and a detecting circuit 74.

The matrix circuit 71 converts a video signal, on which the anti-piracy signal is superimposed, namely the luminance signal Y, the first color difference signal $P_B$, and the second color difference signal $P_R$ into G, B, and R like the matrix circuit 21 in the anti-piracy signal generating circuit 2 does. The controlling circuit 72 also computes the anti-piracy signal distribution ratio elements xg, xb, and xr like the controlling circuit 22 in the anti-piracy signal generating circuit 2 does. The signal compositing circuit 73 composites the anti-piracy signal in the same phase by using the polarities of the distribution ratio elements. When the level P of the composited anti-piracy signal exceeds a predetermined value, the detecting circuit 74 sends the dubbing prohibition signal STOP to the second video unit 6. Thus, the second video unit 6 stops recording an incoming video signal.

Figure 8:
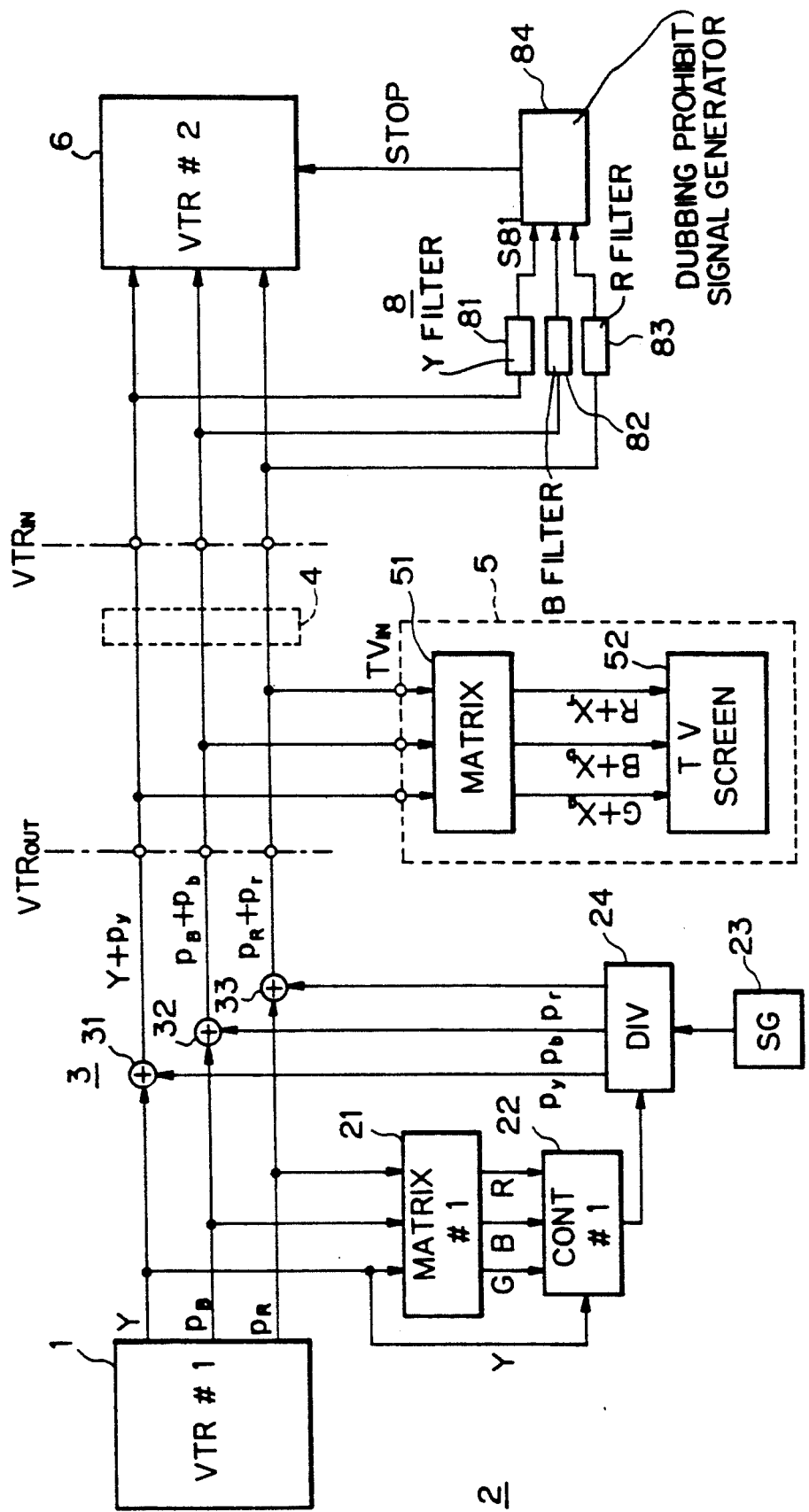
FIG. 8 is a block diagram showing a construction of a second embodiment of the video signal processing apparatus in accordance with the present invention.

FIG. 8 is a block diagram showing a construction of a video signal processing apparatus in accordance with a second embodiment of the present invention.

The video signal processing apparatus is provided with an anti-piracy signal detecting circuit 8 instead of the anti-piracy signal detecting circuit 7 shown in FIG. 1 The anti-piracy signal detecting circuit 8 outputs the dubbing prohibition signal STOP which stops recording a video signal to the second video unit 6 in a different manner from the anti-piracy signal detecting circuit 7 shown in FIG. 1.

The anti-piracy signal detecting circuit 8 is provided with a filter circuit 81 for extracting the anti-piracy signal component py which is superimposed on the reproduced luminance signal Y, a filter circuit 82 for extracting the anti-piracy signal component pb superimposed on the first color difference signal $P_B$, and a filter circuit 83 for extracting the anti-piracy signal component pr which is superimposed on the second color difference signal $P_R$. The anti-piracy signal components py, pb, and pr have the respective anti-piracy frequency $f_{AP}$. The filter circuits 81 to 83 pass the anti-piracy frequency $f_{AP}$.

The dubbing prohibition signal generating circuit 84 integrates signals received from the filter circuits 81 to 83. When the integrated value exceeds a predetermined level, the dubbing prohibition signal generating circuit 84 outputs the dubbing prohibition signal STOP.

Figure 9:
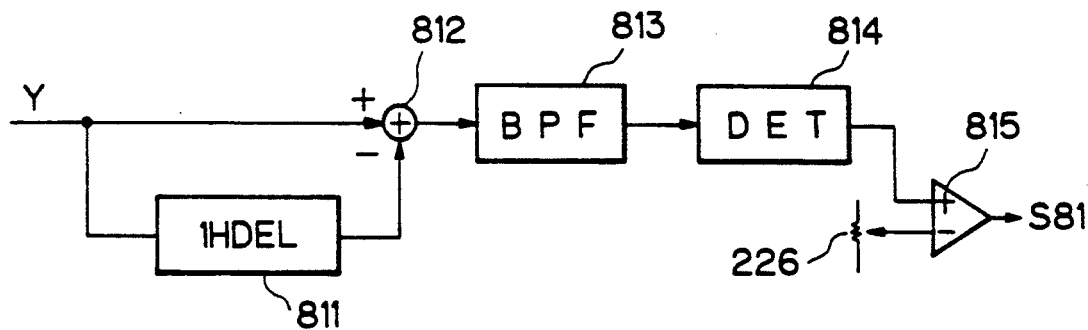
FIG. 9 is a block diagram showing a construction of an anti-piracy signal detecting circuit in a video recording unit shown in FIG. 8.

FIG. 9 is a block diagram showing a construction of the anti-piracy signal detecting circuit 8.

The anti-piracy signal detecting circuit 8 comprises a comb filter consisting of a 1H delaying circuit 811 and a signal adding circuit 812; a band pass filter (BPF) 813 for passing the anti-piracy frequency $f_{AP}$ which is interleaved to the above mentioned frequency $f_H$; and a detector 814. In this circuit construction, the anti-piracy signal component py superimposed on the reproduced luminance signal Y is detected. The detector 814 detects the anti-piracy signal component py. A comparing circuit 815 outputs a threshold value level signal S81 when the detected level exceeds a reference voltage defined by a resistor 226. The anti-piracy signal components pb and pr which are superimposed on the first color difference signal $P_B$ and the second color difference signal $P_R$ are also detected by a circuit similar to the above mentioned circuit. These threshold value level signals are ORed, thereby outputting the dubbing prohibition signal STOP.

Since the anti-piracy signal is intermittently and continuously superimposed to a video signal, once the anti-piracy signal is detected, the dubbing prohibition signal STOP is continuously output, thereby prohibiting the second video unit 6 from recording the the video signal to a video tape.

When a person attempts to remove the anti-piracy signal from a video signal and to illegally dub the video signal, he or she should use an anti-piracy signal removing circuit 4 so as to remove the anti-piracy signal components py, pb, and pr at the front stage of the anti-piracy signal detecting circuit 7 and the second video unit 6 shown in FIG. 1 or at the front stage of the anti-piracy signal detecting circuit 8 and the second video unit 6.

Figure 10:
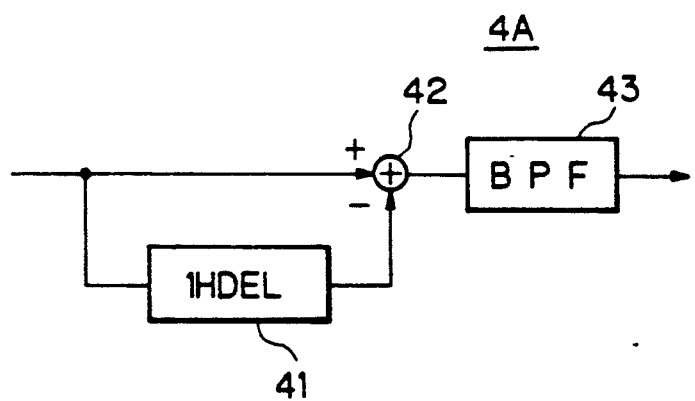
FIG. 10 is a block diagram showing a circuit for removing the anti-piracy signal of FIGS. 1 and 8.

For example, to remove the anti-piracy signal component py superimposed on the luminance signal Y, a filter circuit 4A consisting of a 1H delaying circuit 41, a signal adding circuit 42 and a band pass filter 43 as shown in FIG. 10, which are similar to the 1H delaying circuit 811, the signal adding circuit 812, and the band pass filter 814 shown in FIG. 9, are required. Since this filter has a complicated circuit construction and is expensive, illegal dubbing results in high cost. Normally, since the anti-piracy signal is superimposed on each of the luminance signal Y, the first color difference signal $P_B$, and the second color difference signal $P_R$, three sets of such a complicated circuit are required. Thus, the cost is further increased.

Moreover, to further make illegal dubbing difficult, in the signal generating circuit 23 and in the anti-piracy signal distributing circuit 24, different anti-piracy frequencies are used for the luminance signal Y, the first color difference signal $P_B$, and the second color difference signal $P_R$. Thus, band pass filters having different passing frequency characteristics are required. Thus, illegal dubbing can be substantially prevented.

Furthermore, even if a filter circuit for making such illegal dubbing possible is used, since the anti-piracy signal in accordance with the present invention is selected from a frequency interleaved to the frequency $f_H$ in the frequency band of a video signal as the anti-piracy frequency $f_{AP}$, the video signal is deteriorated. Thus, even if a video signal is illegally dubbed, its quality is remarkably deteriorated.

However, when regardless of anti-piracy signal, a video signal is forcedly recorded by the second video unit 6 at the sacrifice of the image quality, the above mentioned anti-piracy signal removing circuit 4 may be provided.

When the present invention is embodied, various modifications may be made as well as the above mentioned embodiments. For example, the anti-piracy signal having the anti-piracy frequency $f_{AP}$ interleaved on the frequency $f_H$ may be superimposed to only the luminance signal Y, not all components of a video signal. Likewise, the anti-piracy signal may be superimposed to the first color difference signal $P_B$ and the second color difference signal $P_R$.

Figure 11:
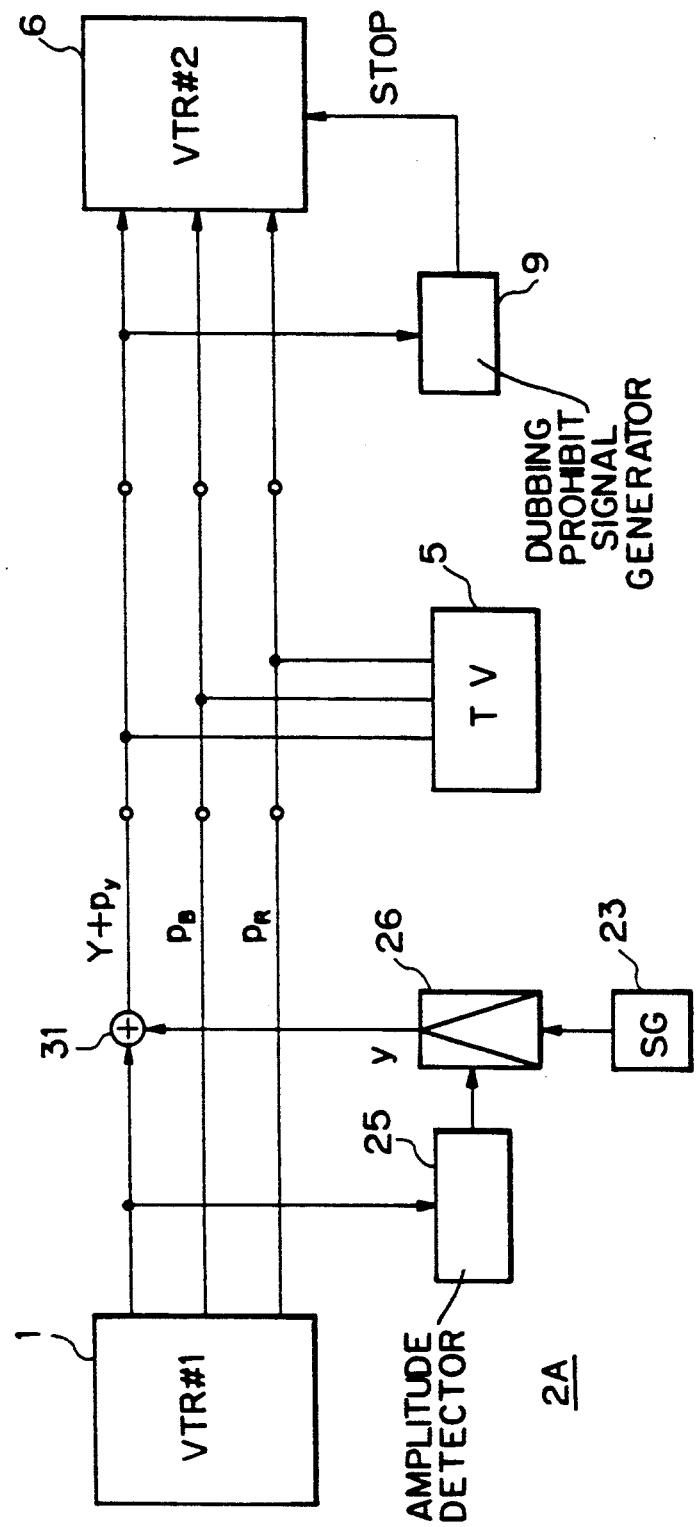
FIG. 11 is a block diagram showing a construction of a third embodiment of the video signal processing apparatus in accordance with the present invention.

FIG. 11 is a block diagram showing a construction of a video signal processing apparatus for superimposing the anti-piracy signal py to only the luminance signal Y in accordance with the construction shown in FIG. 1.

The video signal processing apparatus shown in FIG. 11 is provided with an anti-piracy signal generating circuit 2A instead of the anti-piracy signal generating circuit 2 shown in FIG. 1. The anti-piracy signal generating circuit 2A comprises a luminance signal amplitude detecting circuit 25, the signal generating circuit 23, and a variable-gain amplifying circuit 26.

The luminance signal amplitude detecting circuit 25 detects an amplitude of the luminance signal Y which is received from the first video unit 1 and controls a gain of the variable-gain amplifying circuit 26. The signal generating circuit 23 outputs the signal having the anti-piracy frequency $f_{AP}$. The variable-gain amplifying circuit 26 in cooperation with the luminance signal amplitude detecting circuit 25 outputs the anti-piracy signal component py having an amplitude in accordance with the amplitude characteristic shown in FIG. 5. The signal adding circuit 3 superimposes this anti-piracy signal component py on the luminance signal Y.

To detect the anti-piracy signal component py which is superimposed on the luminance signal Y, a circuit 9 for detecting the anti-piracy signal and for outputting the dubbing prohibition signal is provided instead of the anti-piracy signal detecting circuit 7 shown in FIG. 1 or the anti-piracy signal detecting circuit 8 shown in FIG. 8. The circuit 9 has substantially the circuit construction shown in FIG. 9. In other words, the circuit 9 comprises the 1H delaying circuit 811, the signal adding circuit 812, the band pass filter 813, the detecting circuit 814, the integrating circuit, the resistor 226, and the comparing circuit 815. The integrating circuit not shown in FIG. 9 integrates the anti-piracy signal component py detected by the detecting circuit 814. When the integrated value becomes a predetermined output voltage of the resistor 226, the comparing circuit 815 sends to the second video unit 6 the dubbing prohibition signal STOP which is equivalent to the signal S81.

The intermittent superimpose timing and the amplitude of the above mentioned intermittent pilot signal can be freely set in accordance with the above mentioned manner.

As described above, by superimposing the anti-piracy signal in accordance with the present invention, a high quality image can be reproduced by a monitor unit and illegal dubbing of a video signal is substantially prohibited.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A video signal processing apparatus, comprising:
   means for generating an anti-piracy signal having a plurality of anti-piracy signal components each of a predetermined frequency interleaved to a horizontal scanning frequency in a frequency band of a color video signal and having an amplitude in a predetermined range according to a magnitude of said video signal and including means for converting the video signal into three primary color signals, means for determining signal distribution ratio elements in response to said three primary color signals, and means for producing said anti-piracy signal components in response to said plurality of signal distribution ratio elements; and
   means for respectively superimposing said anti-piracy signal components on a luminance component and on color different components of said color video signal at an intermittent timing.

2. A video signal processing apparatus according to claim 1, wherein said intermittent timing is an interval of several fields.

3. A video signal processing apparatus, comprising:
   means for detecting anti-piracy signal components superimposed on a luminance component and color difference components of a reproduced color video signal each component having a predetermined frequency interleaved to a horizontal scanning frequency in a frequency band of said reproduced video signal, said anti-piracy components having respective amplitudes in a predetermined range according to a ratio of magnitudes of three primary color signals of said reproduced color video signal; and
   a record processing means for prohibiting said reproduced color video signal from being recorded in response to detection of said anti-piracy signal components.

4. A video signal processing apparatus according to claim 3, wherein said detecting means includes a signal compositing circuit for compositing a single anti-piracy signal from said anti-piracy signal components detected in said reproduced color video signal.

5. A video signal processing apparatus according to claim 3, wherein said detecting means includes a comb filter for extracting the anti-piracy signal from said reproduced video signal.

6. A video signal processing circuit for inputting a reproduced color video signal and for removing anti-piracy signal components respectively superimposed on a luminance signal and color difference signals of said reproduced color video signal, said anti-piracy signal components each having a predetermined frequency and being interleaved to a horizontal scanning frequency in a frequency band of said reproduced video signal and having respective signal levels determined by a signal distribution ratio among three primary color signals forming said color video signal.

* * * * *

UNITED STATES PATENT AND TRADEMARK OFFICE
CERTIFICATE OF CORRECTION

PATENT NO. : 5,243,411
DATED : September 7, 1993
INVENTOR(S) : Yoshiki Shirochi, Toshihiko Numakura and Isao Saito It is certified that error appears in the above-indentified patent and that said Letters Patent is hereby corrected as shown below:

On the title page item [56],
In <u>Foreign Patent Documents</u>, change "2,567,753" to --0256753-- and, change "3,606,615" to --0360615--
Col. 3, line 51, change "pre" to --pr--
Col. 6, line 40, change "from around 50 mV" to --of 50 mV--
Col. 8, line 44, change "on" to --to--
        line 45, change "to" to --on--
Col. 9, line 3, change "3" to --31--

In the Claims:

Col. 10, line 8, change "different" to --difference--

Signed and Sealed this

Sixth Day of June, 1995

Attest:

BRUCE LEHMAN

*Attesting Officer*           *Commissioner of Patents and Trademarks*